Jan. 10, 1928.
S. A. CRONE
1,655,756
RAILWAY BRAKE BEAM SUPPORT
Filed Oct. 23, 1925
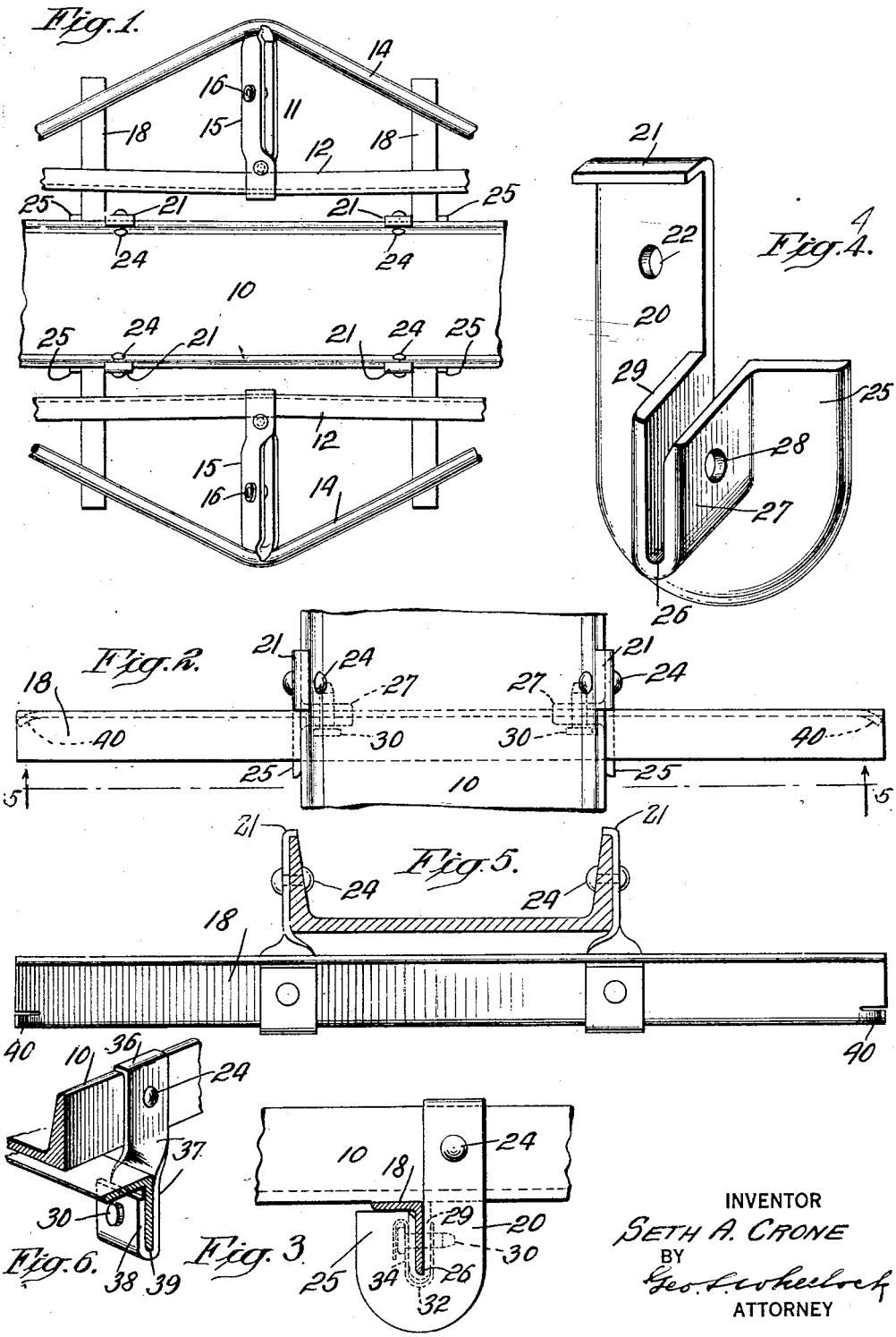
INVENTOR
SETH A. CRONE
BY
Geo. F. Wheelock
ATTORNEY Patented Jan. 10, 1928.

1,655,756

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

RAILWAY-BRAKE-BEAM SUPPORT.

Application filed October 23, 1925. Serial No. 64,298.

The present invention relates to supports for brake beams for railway car trucks, and more particularly to means for securing emergency safety supports to the spring plank or other portion of the car truck to hold the brake beams in case of accidental derangement thereof.

The invention about to be described is of particular utility in connection with car trucks having the usual type of brake beams on the respective sides of a spring plank, and contemplates an inexpensive support for safety bars extending transversely of the plank. While many of the advantages of the invention may be utilized in various types of construction, the preferred embodiment comprises a pair of inexpensive supports for each safety bar attached to the opposite sides of the spring plank to permit a safety bar to be readily secured thereto with its top resting against the bottom of the spring plank, thereby decreasing the length of the supports and minimizing the metal required therefor. The safety bars are firmly supported at two points separated a distance equivalent to the width of the spring plank and the centers of the bars are prevented by the bottom of the plank from bending upwardly, and hence vertical deflection of the ends of the bars is reduced.

An object of the present invention is to minimize the cost of safety supports for brake beams and the like by supporting safety bars substantially in contact with the bottom of a spring plank, thereby utilizing the latter for holding the bars in position and also for preventing deflection thereof.

Another object of the invention is to provide an inexpensive supporting member for safety angle bars and the like, adapted to be attached to the side of the spring plank presenting a flat surface at the lower end thereof, with its lower extremity bent upwardly to form a seat for a safety bar mounted transversely of the spring plank.

Other and further objects of the invention will be obvious upon an understanding of the illustrated embodiment about to be described, or will be indicated in the appended claims, and various advantages secured by the invention other than those herein specifically referred to will occur to one skilled in the art or become evident upon the employment of the invention in practice.

A preferred embodiment of the invention has been selected for purposes of illustration and description, and is shown in the accompanying drawings, wherein Fig. 1 is a top plan view of a portion of a car truck illustrating the present invention applied to the spring plank and the relation of the brake beams thereto;

Fig. 2 is a detailed top plan view of a single safety bar mounted on the spring plank;

Fig. 3 is a cross-sectional view of the safety bar showing the supporting member or hanger and the spring plank in elevation;

Fig. 4 is a detail perspective view of the form of supporting member or hanger shown in Figs. 1, 2 and 3;

Fig. 5 is a cross-sectional view of a modification as it would appear when viewed in the direction of the arrows 5—5 of Fig. 2; and Fig. 6 is a perspective view of the form of supporting member shown in Fig. 5, attached to a spring plank with an angle bar mounted thereon.

Referring to the drawings, there is shown a spring plank 10 of the well known channel form, with the usual type of inside hung trussed brake beams 11 on the respective sides thereof, comprising a compression member 12, a tension member 14, and a strut 15, extending transversely of the central portion of the members and having an aperture 16 adapted to accommodate brake-applying devices not shown. It will be understood that at the juncture of the respective ends of the tension and compression members of the brake beams, brake shoes are attached and hung from the framework of the car truck to engage the four wheels of the truck when pressure is applied to move the brake beams away from the spring plank.

Normally, the brake beams are retained in their proper position by the brake shoes or by the brake-applying mechanism, but since the members making up these parts are sufficiently large to cause derailment of the trucks in case of their falling beneath the wheels thereof, it is desirable and customary to provide safety emergency supports extending under the brake beams to support them in case they become unhung because of broken parts, loosened bolts or the like. In the present construction, the angle bars 18 extending transversely below the spring plank adjacent the ends thereof constitute the safety supports. Their length is such that the brake beams will engage the wheels of the truck before moving beyond the ends thereof.

To provide an inexpensive and efficient support for the safety bars, as shown in Figs. 1 to 4 inclusive, the present invention utilizes a supporting bracket 20 on the respective sides of the spring plank having its upper end flanged at 21 to extend over the side of the spring plank, and having an aperture 22 to facilitate attachment to the spring plank by means of the rivet 24. The lower end of the bracket is formed with an upwardly extending portion 25 forming a seat 26 and having outwardly extending flanges 27 adapted to extend under the spring plank, to hold a safety bar 23 rigidly in position, and to afford an extended bearing surface to eliminate excessive wear on the supporting bracket. Preferably, the dimensions of the parts are such that the angle bar when inserted in the seats 26 of a pair of brackets has its upper surface substantially in contact with the bottom of the plank. The flanges 27 have aligned apertures 28 to cooperate with a corresponding aperture in the safety bar to receive a pin 30 adapted to lock the bar in its seat.

A cotter pin or any other suitable means may be utilized for securing the pin 30 in position but preferably a U-shaped locking member 32 formed of sheet metal fits about the lower portion of the flanges 27, having apertures to correspond with the apertures 28 in the flanges so that the pin 30 will pass through an aperture in its respective ends when inserted to lock the safety bar in position. An elongated leg 34 of the U-shaped member is bent downwardly over the head of the pin when in position to prevent removal thereof. This form of lock is shown in several of my copending applications, and no claim to it is made herein.

Another form of supporting member for safety bars is shown in Figs. 5 and 6 wherein a strip of metal is flanged at its upper end as shown at 36 with a flat portion 33 resting against the side of the spring plank and secured thereto by the rivet 24. The lower end 37 of the strip is twisted through an angle of substantially ninety degrees with its lower extremity bent upwardly at 38 to form a seat 39 similar to that formed by the flanges 27 in the bracket 20 described hereinbefore. The distance between the seat 39 and the bottom of the spring plank 10 is substantially equal to the height of the safety angle bar so that one side thereof may be mounted vertically therein with its other side substantially in contact with the bottom of the plank. Suitable apertures are formed in the lower end 37 of the holding member and in the safety bar to accommodate the pin 30 for securing the safety bar rigidly in position. Preferably, the pin is retained in position by the holding member 32 as described hereinbefore in connection with the supporting bracket 20.

This form of supporting member is very inexpensive since it can readily be stamped and formed from a strip of metal which can be bought in commercial quantities. The length of the strip is a minimum because the safety bar is in contact with the bottom of the spring plank. In addition to saving metal, this permits the spring plank to be utilized for preventing the safety bar from deflecting upwardly at its center portion and downwardly at its ends, and also for preventing the safety bar from rising upwardly out of its seat in case the pin 30 is lost. The emergency supporting members extending transversely of the plank are formed from angle bars to eliminate lateral deflections and to decrease the amount of metal required. The ends of the safety bars are slitted to form lugs which prevent their sliding out of their seats in case the pin 30 is lost.

It will be seen that the present invention utilizes a very advantageous arrangement of parts, whereby an effective and efficient emergency support for brake beams and the like is secured at a minimum cost. All the parts employed in the construction may be inexpensively manufactured from readily obtainable commercial material. The rigidity and effectiveness of the safety bars used are greatly increased by the bars being supported at a plurality of points with their upper surfaces maintained in contact with the bottom of the spring plank. Such a device is adapted to withstand the rough usage which it is likely to encounter in commercial usage.

Both forms of the bracket are adapted for use with close hung brake beams, that is, beams which come very close to a corner formed between each side of the spring plank and the adjacent portion of the safety bar. In the construction shown in Figs. 1 to 4, inclusive, a close juxta-position is possible between a brake beam and the adjoining corner referred to, because in that form of the invention the flanges 27 which provide the seat for the safety bar are located entirely underneath the spring plank, there being only the thickness of the metal of which the bracket is formed outside of each side of the spring plank. In the form shown in Figs. 5 and 6, the twist in the metal is such that the plane of the lower portion of the bracket substantially bisects the plane of its upper portion, and only about half of the width of the lower portion projects beyond the plane of the upper portion, while the other half is under the spring plank, and hence a brake beam may hang much closer in the corner referred to than would be the case where the entire body of the bracket is outward of that side of the spring plank to which the said body is attached. Therefore, in both forms of the bracket a substantial portion of the seat for the bar is underneath the spring plank. It will be seen that the inward flange portions of each bracket which form the seat and the plank engaging flanges 21 or 36 extend in the same direction, and that when the flange 21 or 36 is engaged over the spring plank the upper ends of the inward flange portions will be spaced away from the bottom of the spring plank just sufficient to receive the horizontal flange of the angle metal safety bar.

As various embodiments may be made in the invention above described, it is to be understood that all matter herein set forth is to be interpreted as illustrative and not in a limiting sense.

Having thus described my invention, I claim:—

1. A supporting bracket for safety bars, comprising a metallic member adapted to be secured to the side of a spring plank on a car truck, the upper end of the member having a flange to engage over the spring plank and the lower end of said member being turned through an angle of substantially ninety degrees and extending in the same direction as said flange to present a flat surface to a safety bar, and being bent upwardly to form a seat for said bar.

2. A supporting bracket for safety bars, comprising a metallic member adapted to be secured to the spring plank of a car truck, the upper end of the member having a flange to engage over the spring plank and the lower end of said member being turned through an angle and extending in the same direction as said flange to present a flat surface to a safety bar, and being bent upwardly to form a seat for said bar, the bottom of said seat being spaced from the bottom of the spring plank a distance equal to the width of the bar to utilize the spring plank for holding it firmly in position.

3. A supporting bracket for safety bars, comprising a strip of metal adapted to be secured to the side of a spring plank with its lower end bent upwardly to form a recess to seat a safety bar and retain it in upright position with the upper edge of the bar substantially in contact with the bottom of the spring plank, the upper end of the strip having a flange to engage over the spring plank and the recessed portion extending in the same direction as said flange.

4. A supporting bracket for safety bars, comprising a strip of metal flanged at its upper end to extend over the side of a spring plank and be secured thereto, the lower portion of the strip being twisted to present a flat surface to a safety bar and the extremity of the lower portion being bent upwardly to form a recess to seat, substantially enclose, and retain a safety bar in upright position, said seat extending in the same direction as the upper flange.

5. An emergency support for brake beams, comprising in combination, a spring plank, and a pair of supporting members having flanged upper ends adapted to fit over the sides of the spring plank, the lower ends being twisted to present flat surfaces transversely of the spring plank and being bent upwardly to form seats for a safety bar, each of said seats extending in the same direction as the upper flange of its own member, and a safety bar mounted in said seats extending outwardly under the brake beams on each side of the spring plank.

6. Emergency supports for inside hung brake beams, comprising in combination, a spring plank, and a pair of supporting members on the respective ends of the spring plank, said members being flanged at their upper ends to fit over the sides of said plank, the lower ends of said members being bent upwardly to form seats, each of said seats extending in the same direction as the upper flange of its own member, and safety bars mounted in said seats to extend outwardly under the brake beams on each side of the spring plank.

7. Emergency supports for inside hung brake beams, comprising in combination, a spring plank, and a pair of supporting members at the respective ends of the spring plank, said members having flanged upper ends adapted to fit over the sides of said plank and be secured thereto, the lower ends of said members being bent upwardly to form seats, each of said seats extending in the same direction as the upper flange of its own member, and safety angle bars mounted in said seats with one side of the bars substantially encircled by the ends of said members, and the other side of the bar resting against the bottom of the spring plank to prevent removal from the seats.

SETH A. CRONE.